(12) United States Patent
Hosokawa

(10) Patent No.: US 7,187,942 B2
(45) Date of Patent: Mar. 6, 2007

(54) TRANSMISSION POWER CONTROL SYSTEM

(75) Inventor: Taisuke Hosokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 506 days.

(21) Appl. No.: 10/734,628

(22) Filed: Dec. 15, 2003

(65) Prior Publication Data
US 2004/0127246 A1 Jul. 1, 2004

(30) Foreign Application Priority Data
Dec. 17, 2002 (JP) .............. 2002/364577

(51) Int. Cl.
H04B 7/00 (2006.01)

(52) U.S. Cl. .............. 455/522; 455/506; 455/70; 375/227

(58) Field of Classification Search .............. 455/522, 455/506, 70, 226.3; 375/227; 370/335
See application file for complete search history.

(56) References Cited

U.S. PATENT DOCUMENTS 4,695,969 A * 9/1987 Sollenberger .............. 708/323
6,341,224 B1 * 1/2002 Dohi et al. .............. 455/522
6,639,934 B1 * 10/2003 Engstrom et al. .......... 375/130

FOREIGN PATENT DOCUMENTS

| EP | 1 067 706 A1 | 10/2001 |
| EP | 1 248 388 A1 | 10/2002 |
| JP | 2002-185398 | 6/2002 |
| WO | WO 97/50197 | 12/1997 |
| WO | WO 00/65748 | 11/2000 |

* cited by examiner

Primary Examiner—Matthew D. Anderson
Assistant Examiner—Sanh Phu
(74) Attorney, Agent, or Firm—McGinn IP Law Group, PLLC

(57) ABSTRACT

A desired SIR control part presets the desired SIR value in a way that it decides to this end the degree of follow-up of the desired SIR by the received SIR (measured value), by reading out a desired communication quality value from a demodulating part, reading out a measured communication quantity value from a communication quality measuring part, reading out a desired SIR value from a memory and reading out a measured SIR value from an SIR measuring part. Thus, it is possible to quickly and smoothly cope with the occurrence of a change in the communication environment in the wireless communication in a W-CDMA system or the like between the base station and the mobile station.

19 Claims, 6 Drawing Sheets

RELATED ART

RELATED ART

TRANSMISSION POWER CONTROL SYSTEM

BACKGROUND OF THE INVENTION

This application claims benefit of Japanese Patent Application No. 2002-364577 filed on Dec. 17, 2002, the contents of which are incorporated by the reference.

The present invention relates to transmission power control systems and, more particularly, to outer loop transmission power control systems in mobile wireless communication in W-CDMA (Wideband Code Division Multi Access) system.

In outer loop transmission power control in the W-CDMA system, a mobile station (or a base station) measures such communication quality as BLER (block error ratio) and BER (bit error ratio), and controls desired SIR (desired signal power versus noise power ratio) from the comparison result of the communication quality with the desired communication quality. It is thus possible to indirectly control the transmission power of the base station and obtain desired communication quality. However, when only the comparison of the communication quality is used as the basis of decision, it may become impossible to obtain proper desired SIR control when the transmission power of the base station settles to the maximum or minimum.

Specifically, in the W-CDMA system all the channels may use the same frequency, and interferences from other communication channels may arise. The extent of interference constitutes a main cause of determining the line capacity, and it is preferred in view of the line capacity to make the transmission power of the base station as low as possible. In the meantime, the communication quality in a mobile unit is dependent on the received SIR. In other words, by increasing the transmission power of the base station, the received SIR is increased, thereby improve the communication quality. It is thus necessary to satisfy the communication quality necessary for services to be utilized and preset the optimum transmission power to minimum transmission power.

In the case of wireless communication, unlike the case of wired communication, changes in the ambient environment or movement of the mobile station (or mobile unit) causes changes in the transmission power of the base station that is necessary for obtaining a constant received SIR. Also, the received SIR necessary for obtaining a constant communication quality is changed.

With the above affairs taken into considerations, in the W-CDMA system the transmission power control system is prescribed such that the line capacity and the communication quality can be optimized. The transmission power control is carried out in two stages. In one method, the desired SIR is preset, and a transmission power control signal is sent out to the base station to make the received SIR to be the desired SIR (inner loop transmission power control). The base station controls the transmission power based on the received control signal. The operation will now be briefly described.

In the case of (received SIR)<(desired SIR): a transmission power increase request control signal is sent out.

In the case of (received SIR)>(desired SIR): a transmission power of reduction request control signal is sent out.

In another method, the communication quality is measured at a constant time interval, and the desired SIR is controlled based on the comparison result with the desired communication quality (outer loop transmission power control). The operation will now be briefly described hereinafter.

In the case when the measured communication quality is inferior to the desired communication quality: the desired SIR is increased.

In the case when the measured communication quality is superior to the desired communication quality: the desired SIR is reduced.

Generally, the outer loop transmission power control is slow in the control speed compared to the inner loop transmission power control. This is so because the communication quality measurement requires more time than the case of the SIR measurement.

General techniques concerning the transmission power control method, apparatus and system in such wireless communication are disclosed in various literatures (for instance, see Literature 1: Japanese patent laid-open No. 2002-18539.8 and Literature 2: WO97/50197).

Problems in the prior art will be described with reference to FIGS. 5 and 6. In these FIGS. 5 and 6, the abscissa is taken for time, and the ordinate is taken for base station transmission power (see (A)), SIR (see (B)) and BLER (C)) overlapped one over another in the mentioned order. As shown in (A), the base station carries out the transmission power control based on a control signal sent out from a mobile unit. However, the maximum and minimum levels of transmission power are preset. In the case when the communication quality is inferior to the desired communication quality while the base station transmission power is maximum, by controlling the desired SIR based on the sole communication quality as in the prior art the desired SIR is increased due to the inferior communication quality.

Meanwhile, since the base station transmission power is maximum, the received SIR is brought to a state without follow-up of the desired SIR (state A in FIG. 5). When the communication environment is suddenly improved from the state A, that is, when an environment appears that the desired communication quality is obtainable even with a lower base station transmission power level than the maximum level. The received SIR follows up the desired SIR at the high level (state B in FIG. 5). Subsequently, owing to the large received SIR the satisfactory communication quality state is continued, and the desired SIR is gradually reduced (state C in FIG. 5). Finally, the received SIR is settled in the proper desired SIR (state D in FIG. 5). In the above process, the excessive transmission power state is continued for time E, leading to a long time until the received SIR is converged to the proper desired SIR, which is undesired in view of the line capacity. This problem stems from the fact that because of the maximum base station transmission power level, despite no increase of the received SIR, the desired SIR is increased with the sole communication quality as the reference of decision.

In the converse case when the communication quality is superior to the desired communication quality although the base station transmission power is minimum in level, the desired SIR is reduced owing to the satisfactory communication quality. On the other hand, the received SIR does not follow up the desired SIR because of the minimum base station transmission power level (state A in FIG. 6). When the communication environment is suddenly deteriorated from the state A, that is, when an environment is brought about that the communication quality is inferior or the communication can not be maintained with the minimum base station transmission power level, the received SIR is suddenly reduced by following up the desired SIR (state B in FIG. 6). Subsequently, due to low received SIR the communication quality is deteriorated to result in increase of the desired SIR and the received SIR (state C in FIG. 6). Finally, the received SIR is settled in the proper desired SIR (state D in FIG. 6).

A problem that is encountered in this circumstances is the reduction of SIR in the state B. The desired SIR increase control is made after decision that the communication quality is inferior, and it is thus lower in speed than that speed of follow-up of the desired SIR by the received SIR. Therefore, it is possible that the communication quality is deteriorated to break the communication before increasing the desired SIR by deciding that the communication quality is inferior. This occurs due to the fact that in the state A in FIG. 6 the desired SIR is received despite the failure of follow-up of the desired SIR by the received SIR.

SUMMARY OF THE INVENTION

The present invention was made in view of the above problems inherent in the prior art, and it has an object of providing a transmission power control system capable of quick and smooth cope with the occurrence of a change in the communication environment in the wireless communication in a W-CDMA system or the like between the base station and the mobile station.

According to an aspect of the present invention, there is provided a transmission power control system for controlling, at the time of wireless communication between the base station and a mobile station, the transmission power from the base station to the mobile station to the optimum value by using the desired SIR (desired signal power versus noise power ratio), wherein: the desired SIR is preset on the basis of the communication quality of the communication and the degree of follow-up of the received SIR from the desired SIR.

The degree of follow-up of the desired SIR by the received SIR is decided by the absolute value of the difference between the desired SIR and the received SIR. The degree of follow-up of the desired SIR by the received SIR is decided by the time integral of the absolute value of difference between the desired SIR and the measured value of the received SIR. The absolute value of the difference between the desired value and the measured value is compared with a predetermined threshold, and the desired SIR is increased or reduced based on the result of the comparison. The desired SIR value is stored, and the newly preset desired SIR value is also stored in the memory. The desired SIR is controlled by the desired SIR controller by reading out the desired communication quality value from a demodulator, reading out the desired communication quality value from a communication quality measuring part, reading out the measured SIR value from an SIR measuring unit from a memory, and reading out the measured SIR value from the SIR measuring part. The wireless communication between the base station and the mobile station is a wireless communication system such as W-CDMA system using outer loop transmission power control.

According to another aspect of the present invention, there is provided a transmission power control system comprising: a communication quality measuring part for measures parameters representing the communication quality such as BER and BLER; an SIR measuring part for measures the SIR of the received signal; a demodulating part for demodulating various data from their received signals; a desired SIR control part for determining a desired SIR value based on the desired value and measured value of the communication quality and the desired value and measured value of SIR.

Other objects and features will be clarified from the following description with reference to attached drawings.

PREFERRED EMBODIMENTS OF THE INVENTION

Preferred embodiments of the present invention will now be described with reference to the drawings.

Figure 1:
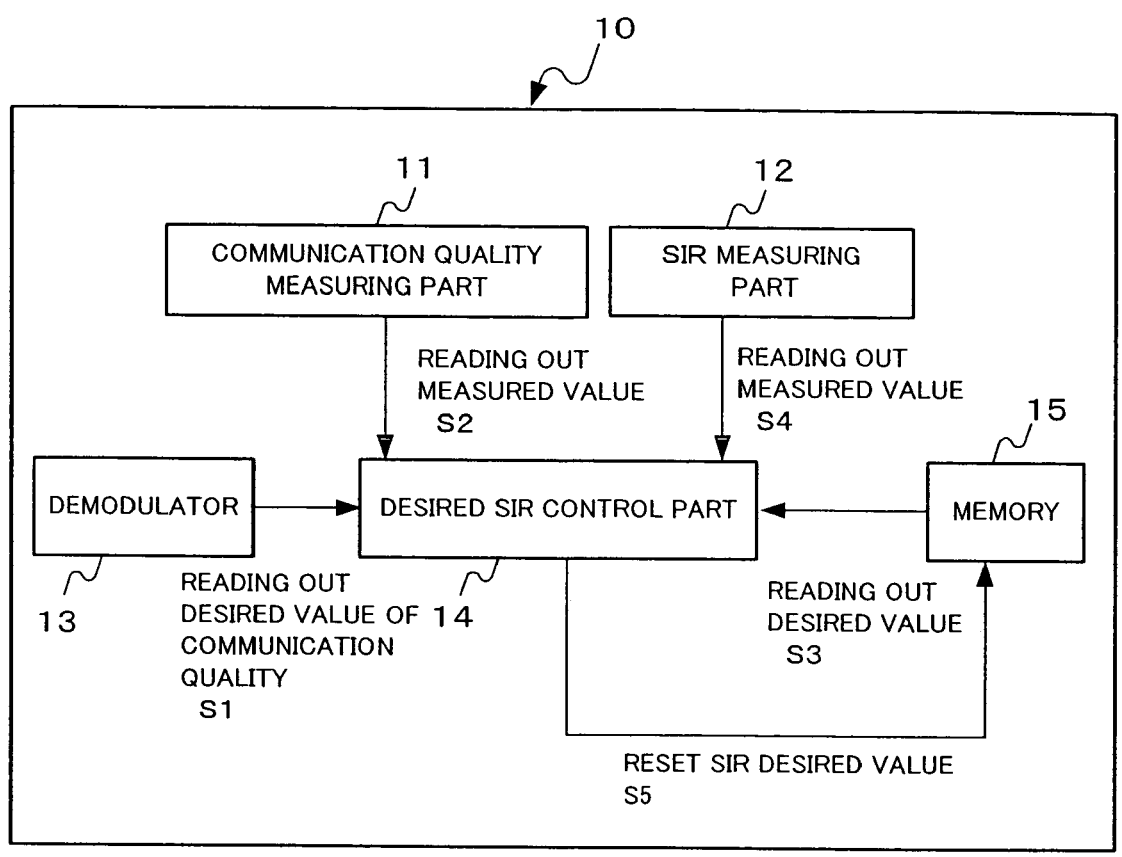
FIG. 1 is a block diagram showing the arrangement of a preferred embodiment of the transmission power control system according to the present invention.

FIG. 1 is a block diagram showing the arrangement of a preferred embodiment of the transmission power control system according to the present invention. A transmission power control part 10 includes a communication quality measuring part 11, an SIR measuring part 12, a demodulating part 13, a desired SIR control part 14 and a memory 15.

The main functions of the constituent parts 11 to 15 of the transmission power control system 10 shown in FIG. 1 will now be described. The communication quality measuring part 11 measures parameters representing the communication quality such as BER and BLER. The SIR measuring part 12 measures the SIR of the received signal. The demodulator 13 demodulates various data from their received signals. The data obtained by the demodulation contains the desired value of the communication quality. In the memory 15, the desired value of SIR is stored. The desired SIR control part 14 reads out the desired value and measured value of the communication quality and the desired value and measured value of SIR from the respective parts, and computes the desired SIR value. The calculated values are stored in the memory 15.

Figure 2:
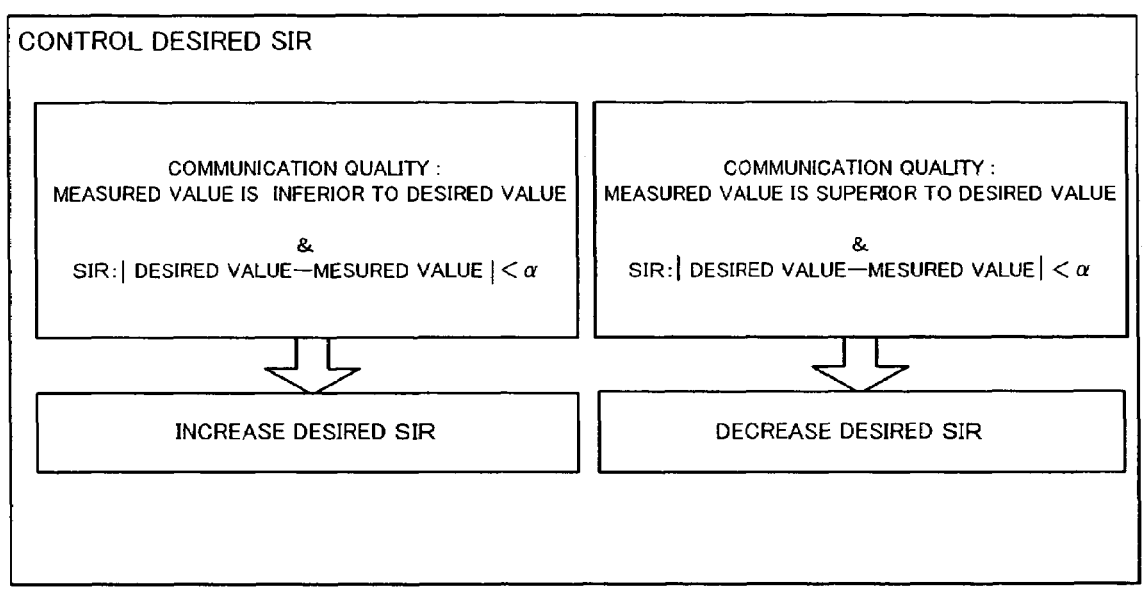
FIG. 2 is a view for explaining the desired SIR control system according to an embodiment of the present invention.

Now, the operation of the entire transmission power control system according to the present invention will be described with reference to FIGS. 1 and 2. The desired SIR control part 14 reads out the desired value of the communication quality from the demodulating part 13 (step S1 in FIG. 1), reads out the measured value of the communication quality from the communication quality measuring part 11 (step S2 in FIG. 1), reads out the desired value of SIR from the memory 15 (step S3 in FIG. 1), reads out the measured value of SIR from the SIR measuring part 12 (step S4 in FIG. 1), and controls the desired SIR from the result of comparison of the read-out desired value and measured value of the communication quality and the degree of follow-up of the desired SIR by the received SIR (see step S5 in FIG. 1 and FIG. 2). As for the comparison of the desired value and measured value of the communication quality, it is possible to use, for the decision, various parameters such as CRC-NG number (recurrence redundancy check) and the like in addition to the BLER and BER for a predetermined period of time, the BLER and BER at the time of reception of a constant quantity of data, and no prescription is given here. The degree of follow-up of the desired SIR by the received SIR is preset to

|(desiredSIR)−(measuredSIR)|. The smaller this value, the follow-up degree is the larger.

By using these two decision references, i.e., "comparison of the desired value and measured value of the communication quality" and "degree of follow-up of desired SIR by received SIR", the following desired SIR control conditions are prescribed as follows.

(Increase of Desired SIR)

Communication quantity:Measured value is inferior to Desired value∩*SIR*:|(desired value)−(measured value)|<α     (equation X)

(here α being a predetermined threshold)

(Reduction of Desired SIR)

Communication quality:Measured value is superior to desired value∩*SIR*:|(desired value)−(measured value)|<α     (equation Y)

In the present invention, a process of changing the desired SIR is executed when and only when the degree of follow-up of the desired SIR by the received SIR is above the threshold α in the (equation X). Thus, when the transmission power of the base station is settled to the maximum or minimum level, the conditions of the equations X and Y are not satisfied, so that the control of the desired SIR is not made.

Figure 3:
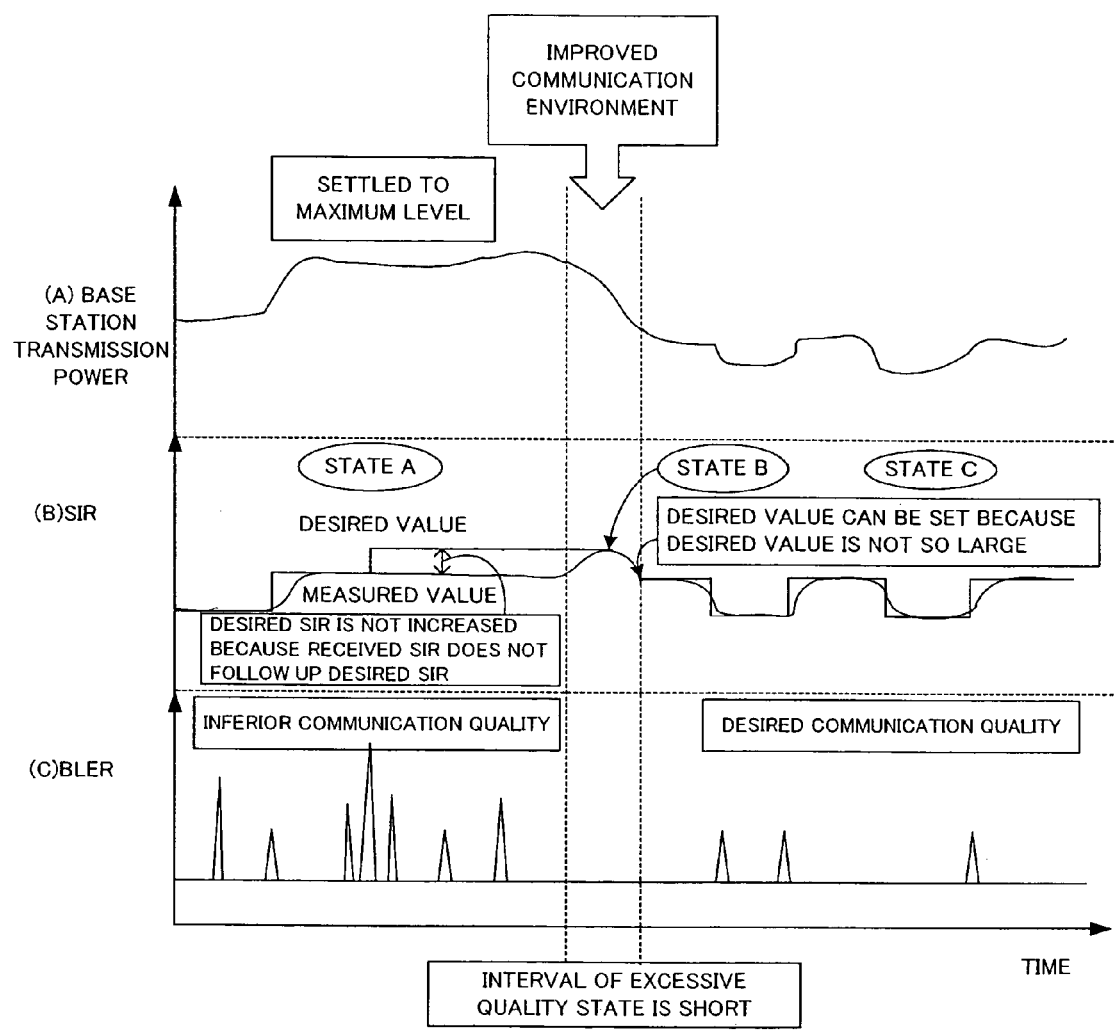
FIG. 3 is a view for explaining the operation where the communication quality is superior according to the present invention.
Figure 4:
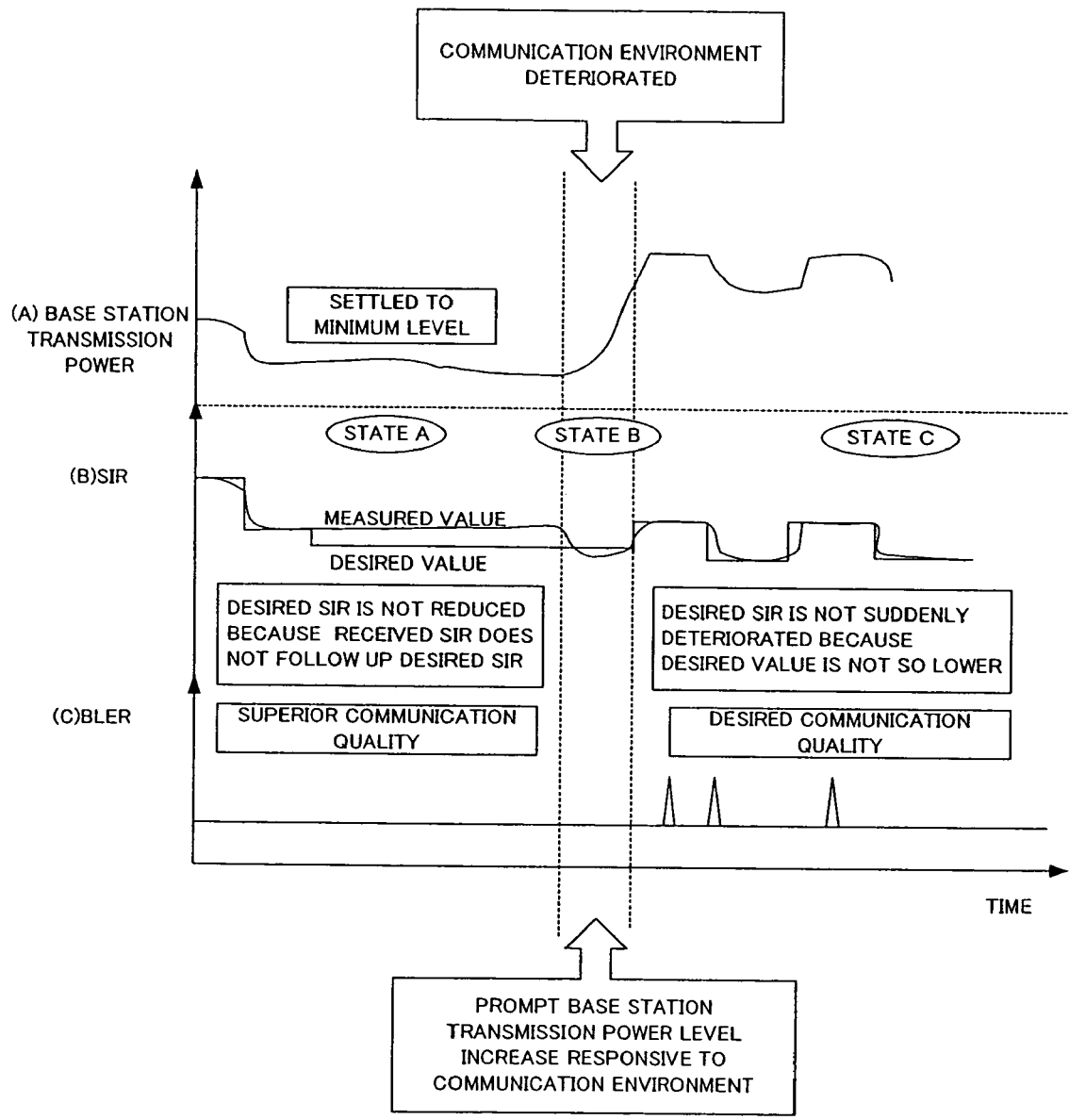
FIG. 4 is a view for explaining the operation where the communication quality is inferior according to the present invention.
Figure 5:
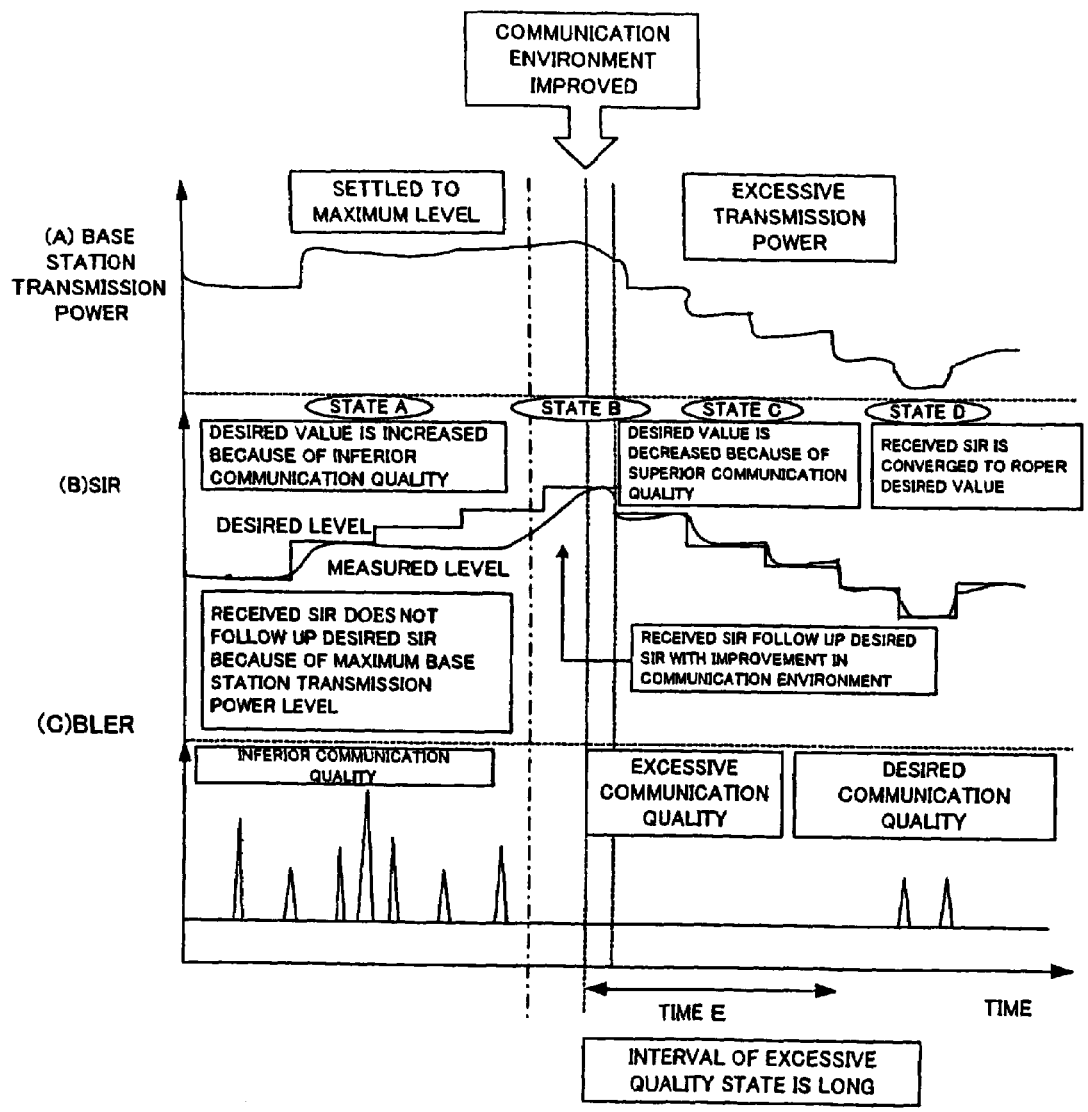
FIG. 5 is a view for explaining the operation where the communication quality is superior according to the prior art technique.
Figure 6:
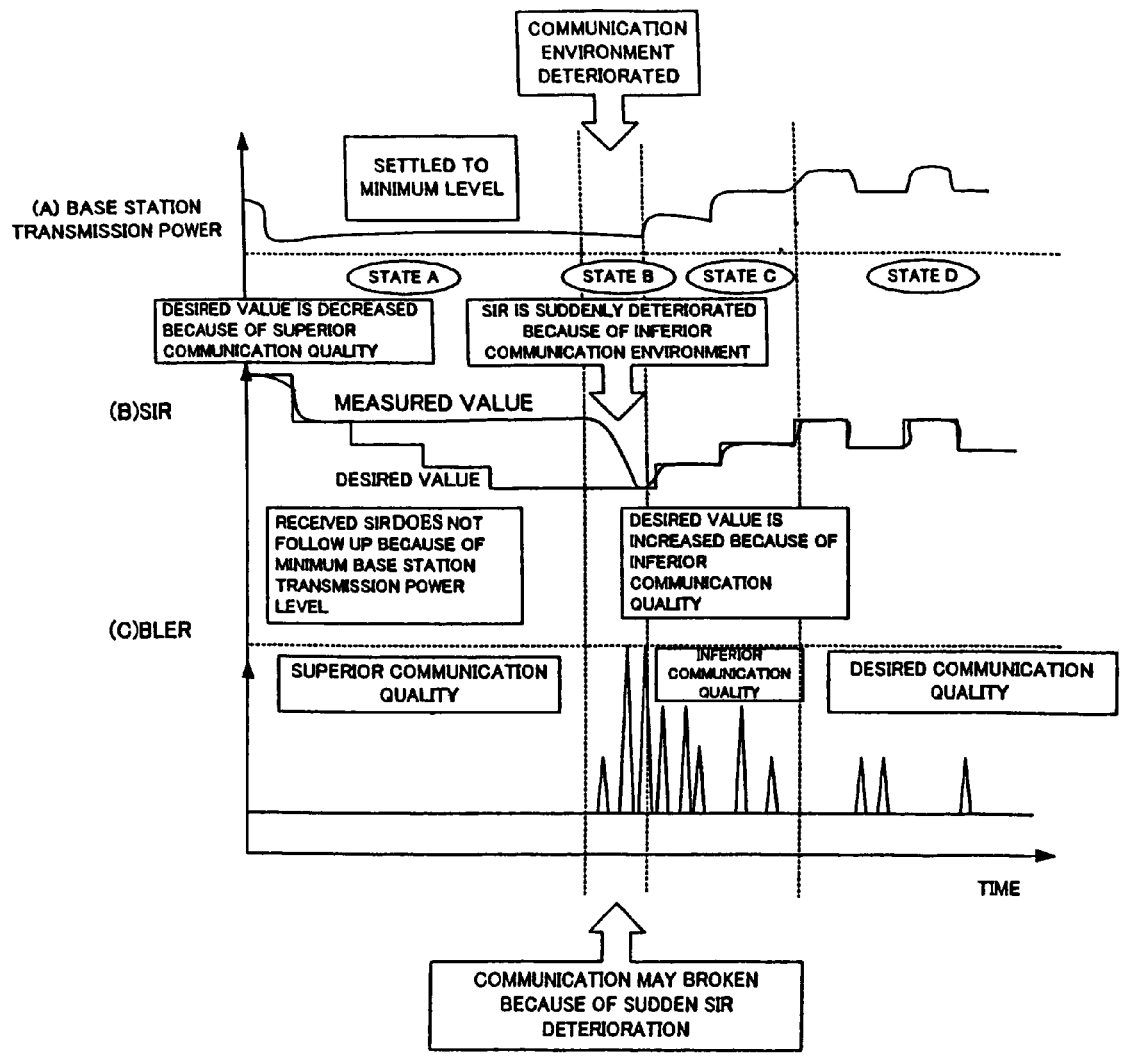
FIG. 6 is a view for explaining the operation where the communication quality is inferior according to the prior art technique.

Now, how improvement of the problems described before in connection with FIGS. 5 and 6 by the control according to the present invention, will be described with reference to FIGS. 3 and 4 which correspond to FIGS. 5 and 6, respectively, noted above. In the case when the communication quality is inferior to the desired communication quality and the base station transmission power is the maximum, the received SIR does not follow up the desired SIR. At this time, the desired SIR is not increased even when the communication quality is inferior to the desired communication quality (state A in FIG. 3). When the communication environment is suddenly improved, it is possible for the received SIR to follow up the desired SIR (state B in FIG. 3). Subsequently, the received SIR is converged to desired SIR which fits the desired communication quality (state C in FIG. 3). In the present invention, since the increase of the desired SIR can be suppressed in the state A, the received SIR is quickly converged to the desired SIR fitting the desired communication quality.

In the meantime, in the case when the communication quality is superior to the desired communication quality with the base station transmission power at the minimum level, the received SIR does not follow up the desired SIR. At this time, the desired SIR is not reduced even when the communication quality is superior to the desired communication quality (state A in FIG. 4). When the communication environment is suddenly deteriorated from this state, the received SIR follows up the desired SIR (state B in FIG. 4). Subsequently, the received SIR is converged to the desired SIR fitting the desired communication quality (state C in FIG. 4). In the state A the desired SIR does not become lower than the received SIR−α, and it is thus possible to suppress the change in the received SIR in the state B irrespective of communication environment deterioration. Thus, it is possible to improve the phenomenon of communication quality deterioration or communication breakage.

Other embodiments or modifications of the above embodiment of the present invention will now be described. While in the above embodiment the absolute value of the difference between the desired SIR and the received SIR, i.e., instantaneous value, is used as the degree of follow-up of the desired SIR by the received SIR, it is also possible to use the time integral of the difference between the desired SIR and the received SIR, i.e., ∫|(desired SIR)−(received SIR)|dt or like formula.

As for the comparison of the desired value and measured value of the communication quality, it is possible to use, for the decision purpose, CRC-NG number or the like in addition to the BLER and BER for a constant time and the BLER and BER at the time of reception of a constant quantity of data. Further, the above embodiment dealt with the mobile station side outer loop transmission power control, the present invention is also applicable to the base station outer loop power control. Further, the present invention is not limited to the W-CDMA system, and is also applicable to other systems as long as outer loop transmission power control is used.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

As has been made obvious in the foregoing, with the transmission power control system according to the present invention, the following pronounced practical effect is obtainable. In the outer loop transmission power control, by making the desired SIR control with the sole communication quality used as decision reference as in the prior art, it may occur a case that the proper desired SIR control can not be obtained at the time of the settling of the base station transmission power to the maximum or minimum level. In contrast, with the transmission power control system according to the present invention, by taking into considerations, for decision, not only the communication quality of the desired SIR control but also the degree of follow-up of the desired SIR by the received SIR (measured value), it is possible to quickly preset the optimum transmission power and improve the problems in the prior art.

What is claimed is:

1. A transmission power control system, comprising:
   a base station; and
   a mobile station in communication with said base station, such that at a time of wireless communication between a base station and a mobile station, a transmission power from the base station to the mobile station is controlled to an optimum value by using a desired SIR (signal power versus noise power ratio), wherein:
   a desired SIR is preset on the basis of a communication quality of the communication and a degree of follow-up of a received SIR from the desired SIR, and the degree of follow-up of the desired SIR by the received SIR is decided by the absolute value of the difference between the desired SIR and the received SIR.

2. The transmission power control system according to claim 1, wherein the degree of follow-up of the desired SIR by the received SIR is decided by a time integral of the absolute value of difference between the desired SIR and a measured value of the received SIR.

3. The transmission power control system according to claim 1, wherein the absolute value of the difference between the desired value and the measured value is compared with a predetermined threshold, and the desired SIR is increased or reduced based on the result of the comparison.

4. The transmission power control system according to claim 1, wherein the desired SIR value is stored, and the newly preset desired SIR value is also stored in a memory.

5. The transmission power control system according to claim 1, wherein the desired SIR is controlled by a SIR controller by reading out a desired communication quality value from a demodulator, reading out the desired communication quality value from a communication quality measuring part, reading out a measured SIR value from an SIR measuring unit from a memory, and reading out the measured SIR value from a SIR measuring part.

6. The transmission power control system according to claim 1, wherein the wireless communication between the base station and the mobile station comprises a wireless communication system including a Wideband Code Division Multiple Access (W-CDMA) system using outer loop transmission power control.

7. A transmission power controlling system comprising:
a communication quality measuring part for measures parameters representing the communication quality including at least one of Bit Error Ratio (BER) and Block Error Ratio (BLER);
a Signal-to-interference ratio (SIR) measuring part for measuring a SIR of a received signal;
a demodulating part for demodulating various data from their received signals; and
a desired SIR control part for determining a desired SIR value based on a desired value and a measured value of the communication quality and the desired value and measured value of SIR, wherein
the desired SIR control part reads, a desired communication quality value from the demodulating part, the desired communication quality value from the communication quality measuring part, a measured SIR value from the SIR measuring part from a memory, and the measured SIR value from the SIR measuring part.

8. The transmission power control system according to claim 1, wherein the desired SIR value is stored, and the newly preset desired SIR value is also stored in a memory.

9. The transmission power control system according to claim 2, wherein the desired SIR value is stored, and the newly preset desired SIR value is also stored in a memory.

10. The transmission power control system according to claim 3, wherein the desired SIR value is stored, and the newly preset desired SIR value is also stored in a memory.

11. The transmission power control system according to claim 1, wherein the desired SIR is controlled by a SIR controller by reading out a desired communication quality value from a demodulator, reading out the desired communication quality value from a communication quality measuring part, reading out a measured SIR value from an SIR measuring unit from a memory, and reading out the measured SIR value from the SIR measuring part.

12. The transmission power control system according to claim 2, wherein the desired SIR is controlled by a SIR controller by reading out a desired communication quality value from a demodulator, reading out the desired communication quality value from a communication quality measuring part, reading out a measured SIR value from an SIR measuring unit from a memory, and reading out the measured SIR value from the SIR measuring part.

13. The transmission power control system according to claim 3, wherein the desired SIR is controlled by a SIR controller by reading out a desired communication quality value from a demodulator, reading out the desired communication quality value from a communication quality measuring part, reading out a measured SIR value from an SIR measuring unit from a memory, and reading out the measured SIR value from the SIR measuring part.

14. The transmission power control system according to claim 4, wherein the desired SIR is controlled by a SIR controller by reading out a desired communication quality value from a demodulator, reading out the desired communication quality value from a communication quality measuring part, reading out a measured SIR value from an SIR measuring unit from a memory, and reading out the measured SIR value from the SIR measuring part.

15. The transmission power control system according to claim 1, wherein the wireless communication between the base station and the mobile station comprises a wireless communication system including a W-CDMA system using outer loop transmission power control.

16. The transmission power control system according to claim 2, wherein the wireless communication between the base station and the mobile station comprises a wireless communication system including a W-CDMA system using outer loop transmission power control.

17. The transmission power control system according to claim 3, wherein the wireless communication between the base station and the mobile station comprises a wireless communication system including a W-CDMA system using outer loop transmission power control.

18. The transmission power control system according to claim 4, wherein the wireless communication between the base station and the mobile station comprises a wireless communication system including a W-CDMA system using outer loop transmission power control.

19. The transmission power control system according to claim 5, wherein the wireless communication between the base station and the mobile station comprises a wireless communication system including a W-CDMA system using outer loop transmission power control.

* * * * *